(12) United States Patent
Stallmann et al.

(10) Patent No.: US 9,249,996 B2
(45) Date of Patent: Feb. 2, 2016

(54) COMPRESSION CONDENSATE CONDITIONING IN THE FLUE GAS CONDENSER

(71) Applicant: ALSTOM Technology Ltd, Baden (CH)

(72) Inventors: Olaf Stallmann, Essenheim (DE); Ulrich Rückert, Hofheim (DE)

(73) Assignee: ALSTOM Technology Ltd, Baden (CH)

( * ) Notice: Subject to any disclaimer, the term of this patent is extended or adjusted under 35 U.S.C. 154(b) by 150 days.

(21) Appl. No.: 14/053,786

(22) Filed: Oct. 15, 2013

(65) Prior Publication Data

US 2014/0033747 A1 Feb. 6, 2014

Related U.S. Application Data

(63) Continuation of application No. PCT/IB2012/000727, filed on Apr. 11, 2012.

(30) Foreign Application Priority Data

Apr. 15, 2011 (EP) ..................................... 11162691

(51) Int. Cl.
| | |
|---|---|
| *B01D 19/00* | (2006.01) |
| *B01D 53/00* | (2006.01) |
| *F25B 1/00* | (2006.01) |
| *B01D 53/26* | (2006.01) |

(52) U.S. Cl.
CPC . *F25B 1/00* (2013.01); *B01D 19/00* (2013.01); *B01D 53/00* (2013.01); *B01D 53/002* (2013.01); *B01D 53/265* (2013.01); *B01D 2256/22* (2013.01); *B01D 2257/504* (2013.01); *B01D 2257/80* (2013.01)

(58) Field of Classification Search
CPC ................................ B01D 53/00; B01D 19/00
USPC ............. 95/39, 241, 266, 254, 256, 257, 258; 62/115, 498
See application file for complete search history.

(56) References Cited

U.S. PATENT DOCUMENTS

| | | | |
|---|---|---|---|
| 2006/0213221 | A1 | 9/2006 | Lee et al. |
| 2014/0041562 | A1* | 2/2014 | Grubbstrom .................. 110/345 |

FOREIGN PATENT DOCUMENTS

| | | |
|---|---|---|
| CN | 101716458 A | 6/2010 |
| CN | 10939075 A | 1/2011 |
| EP | 1 790 614 | 5/2009 |
| GB | 2 454 266 | 5/2009 |
| TW | 201029316 A | 8/2010 |
| WO | 2007/019632 | 2/2007 |
| WO | 2010/001038 | 1/2010 |
| WO | 2010/060978 | 6/2010 |
| WO | 2010/113364 | 10/2010 |
| WO | 2010/142716 | 12/2010 |

OTHER PUBLICATIONS

Search Report issued Oct. 14, 2013 by the Taiwanese Patent Office in corresponding ROC (Taiwan) Application No. 101113324 (9 pages).

* cited by examiner

Primary Examiner — Robert A Hopkins

(57) ABSTRACT

The invention relates to a method of conditioning a condensate generated in the compression section of a gas purification unit. The invention also relates to system for this method.

14 Claims, 4 Drawing Sheets

COMPRESSION CONDENSATE CONDITIONING IN THE FLUE GAS CONDENSER

CROSS-REFERENCE TO RELATED APPLICATIONS

This application claims priority to PCT/IB2012/000727 filed Apr. 11, 2012, which in turn claims priority to European application 11162691.7 filed Apr. 15, 2011, both of which are hereby incorporated in their entireties.

FIELD OF THE INVENTION

The present invention relates to a method of conditioning compression condensate in a flue gas condenser. The invention relates also to the system for the conditioning of the compression condensate.

BACKGROUND

The invention relates to degassing of condensate obtained in the course of compressing a $CO_2$ rich gas stream and subsequent cooling in one or multiple stages. In previous known systems the condensate is returned directly to the waste water treatment system. Eventually necessary conditioning of the condensate has been performed directly in the pipework connecting the source and the treatment system.

For the current size of plants in operation the before described solution is adequate. However, for commercial size units an approach like the before described would impose a potential risk of asphyxiation to the operators due to accumulation of heavy gases like $CO_2$ in the sewer system and/or uncontrolled release at the waste water treatment plant. Therefore there is a need for a safer system for the conditioning and degassing of the condensate.

SUMMARY

An object of the present invention is to provide a method of removing gases, especially $CO_2$ gases from the condensate generated in a system of interstage coolers.

In one embodiment of the invention a method of conditioning the condensate generated in the compression section of a gas purification unit is provided. The method comprises the following steps:
  a) compressing the carbon dioxide rich flue gas from a gas cooling, condensing and/or cleaning device;
  b) cooling of the gas below the water dew point ;
  c) recirculating the condensate formed during the cooling in b) comprising carbon dioxide to the inlet of the lower end of the gas cooling, condensing and/or cleaning device;
  d) introducing the condensate of step c) to the gas cooling, condensing and/or cleaning device;
  e) degassing of the condensate whereby the carbon dioxide rich vapor is released into the vapor phase in the lower end of the gas cooling, condensing and/or cleaning device.

By the method of the invention it is possible to avoid that clouds and accumulation of $CO_2$ in the water treatment system is formed. Also other undesirable components, such as asphyxiating or toxic components in the sewer and water treatment system may be avoided by removing the $CO_2$ rich vapor phase from the condensate stream.

Further advantages achieved by the method is that a higher CO2 recovery of up to 0.3% can be achieved, than with conventional methods. Another operational advantage achieved is that smaller piping in the equipment is required due to that only a single phase is flowing in the system after the degassing.

In another embodiment of the invention a method of conditioning the condensate generated in the compression section of a gas purification unit as above is provided where the method also comprises post combustion CO2 capture purification. Examples of applicable post combustion CO2 capture purification systems are for example an amine based absorption, a chilled ammonia absorption or any other process requiring the cooling and partly water condensation of the flue gas prior to CO2 removal and compression.

In an embodiment the method also comprises a step d) introducing the condensate of step c) into a separate compartment arranged within the gas cooling, condensing and/or cleaning device, for vapor disengagement/release and optional conditioning (e.g. neutralization) of the condensate.

The water condensed, the compressed waste water can contain impurities in higher amounts, due to the increase of the partial pressure during compression or because of acid formation which promotes heavy metal leaching out of the CO2 rich flue gas. By this embodiment it is possible to treat the compressed waste water, that contains higher amounts of impurities of components like acids or heavy metals, separately, while an existing equipment may be used. Thus by the invention it is provided a method to save plot space for installation and lower investment costs for a new alternative equipment.

A further embodiment is a method wherein step d) comprises
  d) introducing the condensate of step c) into the lower part of the gas cooling, condensing and/or cleaning device.
This embodiment is suitable in situations wherein the condensate is less polluted and it is possible to mix with the water/liquid of the lower part of the flue gas condenser.

Another embodiment of the invention is the method as above including the following steps: step c) recirculating the condensate of step b) into a vessel for releasing the carbon dioxide rich vapor and conditioning the condensate;
  d) forwarding the carbon dioxide rich vapor to the gas cooling, condensing and/or cleaning device.

An advantage of this embodiment is that it offers an easy way to upgrade the solution including the compressed waste water that contains high amounts of impurities like acids or heavy metals, In one embodiment of the invention a system for conditioning the condensate generated in the compression section of a gas purification unit is provided. The gas cleaning system comprises a gas cooling, condensing and/or cleaning device, the so called flue gas condenser,
  being operative for receiving at least a portion of partly cleaned carbon dioxide rich flue gas;
  being operative for removing at least a portion of the water content of the partly cleaned carbon dioxide rich flue gas to condense water therefrom;
means for compressing the carbon dioxide rich flue gas;
means for condensing water vapor from the carbon dioxide rich flue gas;
means for releasing parts of the carbon dioxide included in the water and returning it back to the flue gas.

In one embodiment of this invention the system also comprises a gas purification unit comprising a post combustion CO2 capture purification unit.

The post combustion CO2 capture purification unit may be an unit for amine based absorption. Another option would be that the post combustion CO2 capture purification is performed in a chilled ammonia system.

Another embodiment of the invention is a system for cleaning and/or conditioning a condensate as described above wherein the water comprising the carbon dioxide rich vapor phase is introduced into a separate compartment of the bottom of the flue gas condenser. The system may also comprise means for conditioning the remaining, degassed condensate. The conditioning means for example that the condensate is neutralized before further treatment.

The neutralization may be performed by conventional methods, like adding basic agents, for example caustic soda etc.

The advantage achieved by the embodiment above is that it is possible to use the existing system and by that also less piping is needed, and also less safety devices.

In one embodiment of the system for cleaning and/or conditioning a condensate as described above, the water comprising the carbon dioxide rich vapor phase is introduced into the bottom level of the flue gas condenser.

In a further embodiment the system for cleaning and/or conditioning the condensate, as described above, the system comprises:

means for forwarding the water comprising the carbon dioxide rich vapor phase to a vessel for separation of water and carbon dioxide rich vapor phase. Also means for conditioning the remaining, degassed condensate, for example by neutralization, may be included in the system. Further, the system may also include means for introducing the released carbon dioxide into the flue gas condenser.

An advantage with this embodiment is that the degassing of the condensate and flue gas condenser do not have to be located physically near to each other. Also the dimensions and lengths of the piping returning the vapor may be smaller and of cheaper material than piping equipment for the condensate.

BRIEF DESCRIPTION OF THE DRAWINGS

The invention will now be described in more detail with reference to the appended drawings in which.

DETAILED DESCRIPTION

Figure 1:
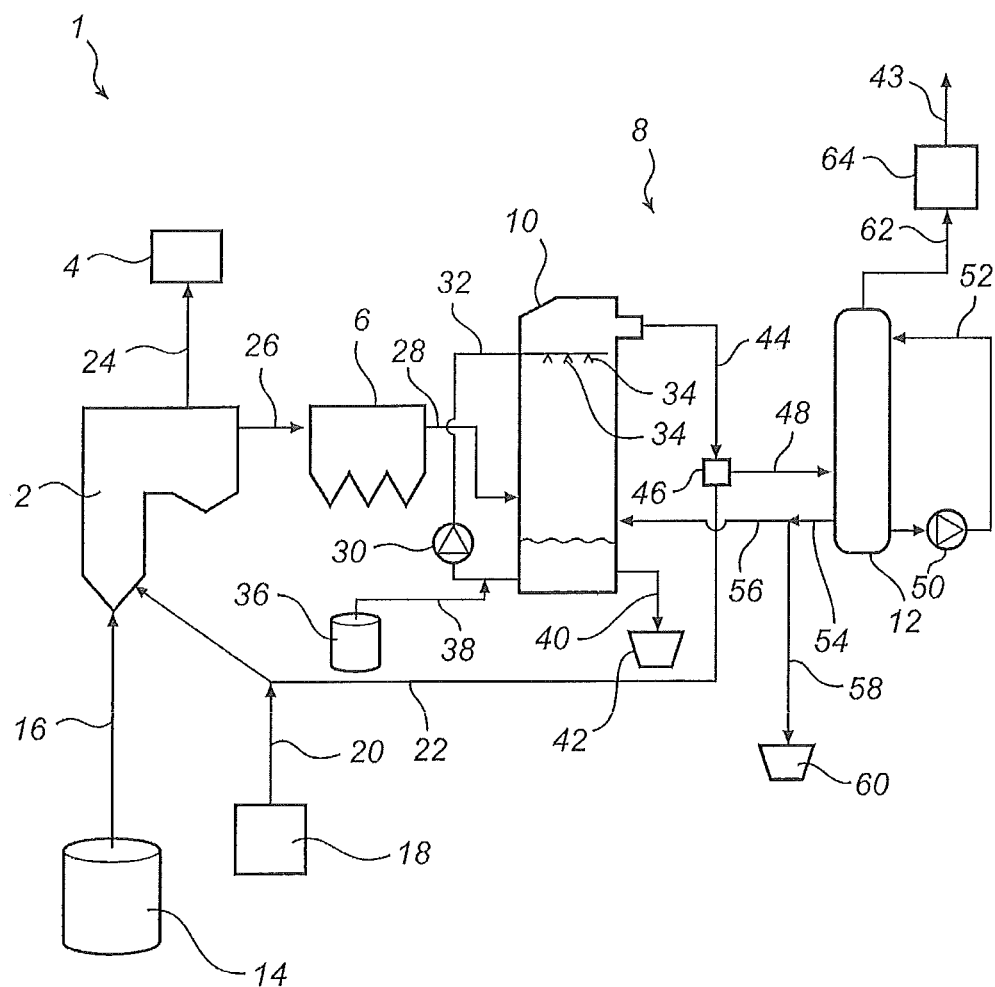
FIG. 1 is a schematic side view of an oxy boiler system in accordance with one embodiment.

FIG. 1 is a schematic representation of a boiler system 1, as seen from the side thereof. The boiler system 1 comprises, as main components, a boiler 2, being in this embodiment an oxy-fuel boiler, a steam turbine, schematically indicated as 4, a particulate removal device in the form of an electrostatic precipitator 6, and a gas cleaning system 8. The gas cleaning system 8 comprises, as its main components, a first gas cleaning device in the form of a wet scrubber 10, and a second gas cleaning device in the form of a flue gas condenser 12.

A fuel, such as coal or oil, is contained in a fuel storage 14, and can be supplied to the boiler 2 via a supply pipe 16. An oxygen gas source 18 is operative for providing oxygen gas in a manner which is known per se. The oxygen gas source 18 may be an air separation plant operative for separating oxygen gas from air, an oxygen separating membrane, a storage tank, or any other source for providing oxygen to the system 1. A supply duct 20 is operative for forwarding the produced oxygen gas, comprising typically 90-99.9 vol. % oxygen, O2, to the boiler 2. A duct 22 is operative for forwarding recirculated flue gas, which contains carbon dioxide, to the boiler 2. As indicated in FIG. 1 the supply duct 20 joins the duct 22 upstream of the boiler 2, such that oxygen gas and recirculated flue gas, which contains carbon dioxide, may become mixed with each other to form a gas mixture containing typically about 20-50% by volume of oxygen gas, the balance being mainly carbon dioxide and water vapour, upstream of the boiler 2. Since almost no air enters the boiler 2 there is almost no nitrogen gas supplied to the boiler 2. In practical operation, less than 3 vol. % of the gas volume supplied to the boiler 2 is air, which mainly enters the boiler 2 as a leakage of air. The boiler 2 is operative for combusting the fuel, that is to be supplied via the supply pipe 16, in the presence of the oxygen gas, mixed with the recirculated flue gas, which contains carbon dioxide, that is to be supplied via the duct 22. A steam pipe 24 is operative for forwarding steam, that will be produced in the boiler 2 as a result of the combustion, to the steam turbine 4, which is operative for generating power in the form of electric power. A duct 26 is operative for forwarding carbon dioxide rich flue gas generated in the boiler 2 to the electrostatic precipitator 6. By "carbon dioxide rich flue gas" is meant that the flue gas leaving the boiler 2 via the duct 26 will contain at least 40% by volume of carbon dioxide, CO2. Often more than 50% by volume of the flue gas leaving the boiler 2 will be carbon dioxide. The balance of the "carbon dioxide rich flue gas" will be about 20-50% by volume of water vapour (H2O), 2-7% by volume of oxygen (O2), since a slight oxygen excess is often preferred in the boiler 2, and totally about 0-10% by volume of other gases, including mainly nitrogen (N2) and argon (Ar), since some leakage of air can seldom be completely avoided.

The electrostatic precipitator 6, removes most of the dust particles from the carbon dioxide rich flue gas. As alternative to an electrostatic precipitator a fabric filter, may be utilized for removing the dust particles. A duct 28 is operative for forwarding the carbon dioxide rich flue gas from the electrostatic precipitator 6 to the wet scrubber 10 of the gas cleaning system 8.

The wet scrubber 10 comprises a circulation pump 30 a slurry circulation pipe 32, and a set of slurry nozzles 34 arranged in the wet scrubber 10. The slurry nozzles 34 are operative for finely distributing slurry in the wet scrubber 10 and to achieve good contact between slurry and the flue gas being forwarded to the wet scrubber 10.

An at least partly cleaned carbon dioxide rich flue gas leaves the wet scrubber 10 via a duct 44 which forwards the flue gas to a gas distribution point 46. At the gas distribution point 46, being located between the wet scrubber 10 and the condenser 12, as seen with respect to the direction of the flow of the partly cleaned carbon dioxide rich flue gas, the partly cleaned carbon dioxide rich flue gas is divided into two portions, namely a first flow, which via the duct 22 is recirculated back to the boiler 2, and a second flow, which via a duct 48 is forwarded to the condenser 12. The condenser 12 is provided with a circulation pump 50 which is operative for circulating a cooling liquid, via a circulation pipe 52, in the condenser 12 in a manner which will be described in more detail hereinafter.

The flue gas condenser 12 where the flue gas is cooled below its water dew point and the heat released by the resulting condensation is recovered as low temperature heat. The water content of the flue gas may for example be reduced from about 40% by volume in the flue gas fed to the flue gas condenser to about 5% by volume in the flue gas leaving the flue gas condenser. Depending on pH and temperature in the flue gas condenser, the flue gas condensation may also lead to a reduction of sulfur oxides, SOX, in the flue gas. The sulfur oxides are captured in the formed condensate and separated from the flue gas. Furthermore, wash liquid or slurry, e.g. lime slurry, entrained in the flue gas from the preceding sulfur dioxide removal step is removed during the condensation.

The cooling liquid being circulated in the condenser 12 cools the partly cleaned carbon dioxide rich flue gas to a temperature which is below its saturation temperature, with respect to water vapour, and, hence, causes a condensation of at least a portion of the water vapour content of the partly cleaned carbon dioxide rich flue gas being forwarded from the wet scrubber 10. The condensed water leaves the condenser 12 via a disposal pipe 54. A portion of the condensed water leaving the condenser 12 via the pipe 54 is forwarded to the wet scrubber 10 via a pipe 56 as make up water. A further portion of the condensed water is forwarded, via a pipe 58, to a water treatment unit 60, in which the condensed water is treated prior to being disposed. The cleaned carbon dioxide rich flue gas leaves the condenser 12 via a duct 62 and is forwarded to a gas processing unit (GPU) 64 in which the cleaned carbon dioxide rich flue gas is compressed followed by cryogenic CO2 separation.

In the CO2 separation system, CO2 is at least partially separated from the light gases (e.g. N2, Ar, O2) of the flue gas by compression and condensation. Compressed carbon dioxide hence leaves the CO2 separation system via a duct 43 and is transported away for further use or storage, which is sometimes referred to as "CO2 sequestration".

The CO2 separation in the GPU is achieved by means of compression of the flue gas and condensation. The CO2 separation system for condensation of carbon dioxide (CO2) in a flue gas stream be implemented as shown in the boiler system of FIG. 1.

The CO2 separation system 64 may optionally comprise at least one compressor 44 having at least one, and typically two to ten compression stages for compressing the carbon dioxide rich flue gas. The flue gas compressor is operative for compressing the flue gas to a pressure at which gaseous CO2 is converted to liquid form when the temperature of the flue gas is reduced to a temperature below −20°, preferably to a temperature of −51°, in the CO2 separation section of the GPU (not shown in detail). The carbon dioxide rich flue gas is generally compressed to a pressure of about 20 bar or higher, such as about 33 bar, in the multistage compressor. Each compression stage could be arranged as a separate unit. As an alternative several compression stages could be operated by a common drive shaft. The compressor 44, 44', 44", 44"' may also comprise a gas cooling unit 70, 70', 70", respectively 80 and 82, downstream of one or more of the compression stages. The gas cooling unit may further be configured to collect and dispose of any liquid condensate formed during compression and/or cooling of the carbon dioxide rich flue gas.

Figure 2:
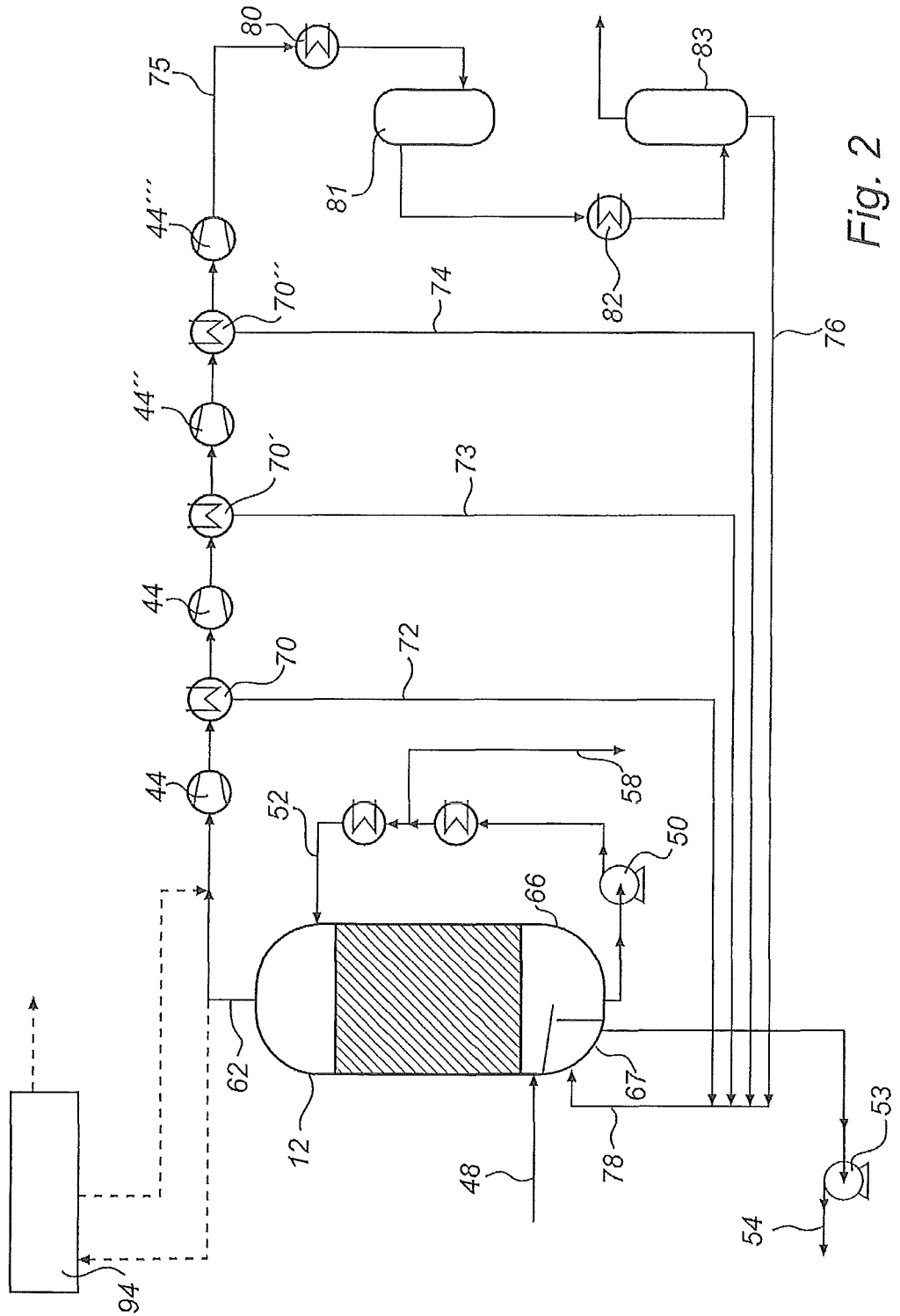
FIG. 2 is a schematic side view of a system comprising the flue gas condenser having a separate compartment for the condensate, in accordance with a first embodiment.

FIG. 2 illustrates further the flue gas condenser 12 and the compressor 44, 44', 44", 44"' may also comprise a gas cooling unit 70, 70', 70". From each gas cooling unit is the liquid condensate is forwarded via a duct 72, 73, 74, and collected in the duct 78, to the compartment 67 placed in the lower part 66 of the gas cooling, condensing and/or cleaning device 12. The inlet of 78 is placed below the inlet of duct 48. An internal roof is installed above the separate compartment to prevent entrainment of cooling liquid from the flue gas condenser.

It is also possible to install level controllers (not shown) within the separate compartment 67, and minimum and maximum levels of liquid to be determined. The liquid in the separate compartment 67 may be kept at different level than the liquid in compartment 66.

The internal roof is preferably sloping to let the cooling liquid fall down into compartment 66.

In the preferred embodiment the carbon dioxide rich flue gas obtained in the multistage compressor is forwarded via duct 75 to a first gas cooler.

The carbon dioxide rich flue gas is cooled optionally to a temperature of about 60 degrees by heat exchanger 80, before the gas enters optionally an mercury absorber 81. The temperature of the gas obtained after the mercury absorber 81 is kept 10 to 15° C. above the dew point temperature of the flue gas.

The carbon dioxide rich flue gas is then forwarded to a second gas cooler 82 where the temperature is lowered below the water dew point and liquid water is separated in a vessel 83 prior to further processing of the flue gas in the CO2 drying and separation system (not shown).

From the vessel 83 the waste water may be forwarded via the duct 76 to be combined in 78 and recirculated to the compartment 67.

The condensate collected in the separate compartment 67 of the flue gas condenser for gas cooling, condensing and/or cleaning the condensate. The condensate is degassed whereby the carbon dioxide rich vapor is released into the vapor phase in the lower end (66) of the gas cooling, condensing and/or cleaning device (12). Then, optionally the conditioning of the condensate is performed, thus the condensate is neutralized, for example by treatment with caustic soda (sodium hydroxide (NaOH)).

The degassed and conditioned condensate obtained in the separate compartment 67 may be forwarded via duct 54, and pump 53, to waste water treatment according to conventional methods. The water may also be recirculated to the scrubber via duct 56 FIG. 1 to the wet scrubber 10, if the amount of pollutants acceptable for further use.

Optionally, the flue gas condenser 12 may be fed with flue gas from an conventional boiler system using air. The plant may also include an unit for post combustion CO2 capture purification 94. From the flue gas condenser 12 the gas is forwarded to the unit 94. The post combustion CO2 capture purification may be an amine based absorption system, or a chilled ammonia CO2 capture system. Also other conventional systems and processes may be applied for the post combustion CO2 capture purification.

Out of the then CO2 lean flue gas CO2 is separated and the concentrated CO2 sent to the compression unit 44. The residual flue gas out of the post combustion unit 94 may be routed to stack.

Figure 3:
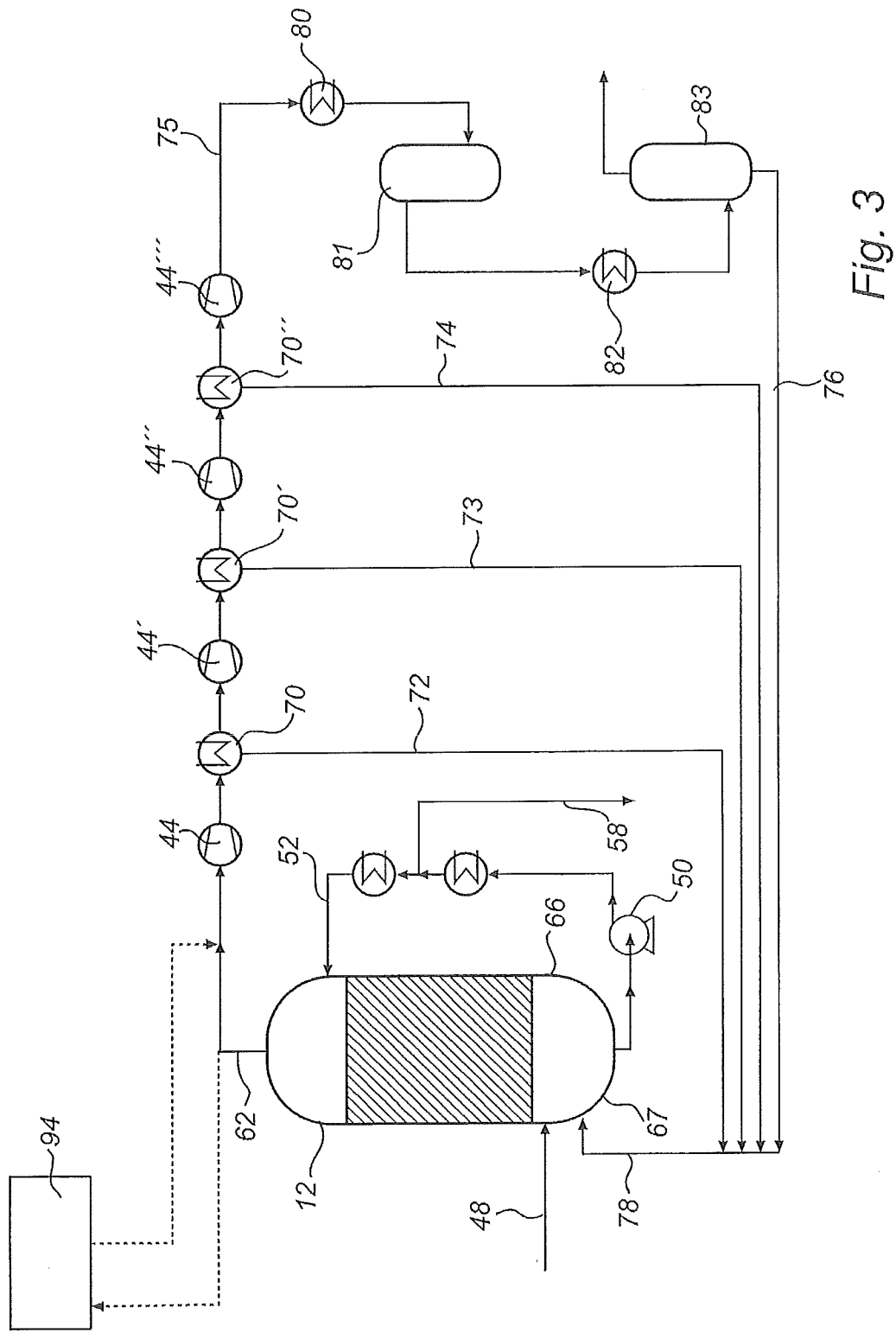
FIG. 3 is a schematic side view of a system comprising a flue gas condenser whereto the condensate recirculated, in accordance with a second embodiment.

FIG. 3 illustrates an embodiment where the condensate is forwarded to the flue gas condenser via the duct 78. This embodiment is suitable when the amount of contaminants and pollutants of the condensate is limited. The condensate is fed into the lower end of the flue gas condenser 66. Also in this embodiment, an optional unit for post combustion CO2 capture purification 94 may be included as described above.

Figure 4:
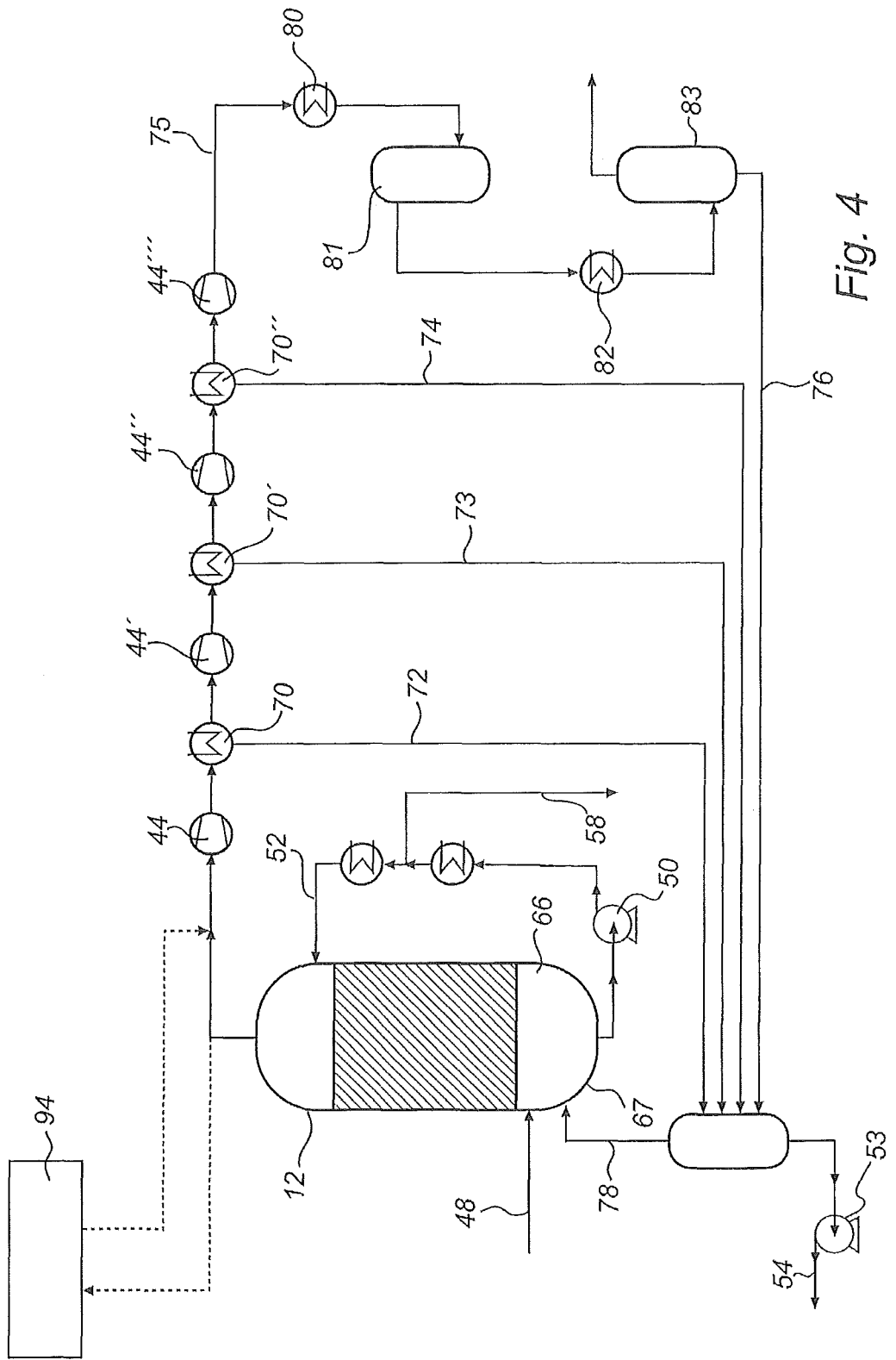
FIG. 4 is a schematic side view of a system comprising a flue gas condenser and a separate vessel for collecting the condensate, in accordance with a third embodiment.

FIG. 4 illustrates an embodiment where the condensate is recirculated to a vessel 85 wherein the condensate is degassed, i.e. carbon dioxide rich vapor is released, and forwarded to the flue gas condenser via duct 78. Conditioning of the condensate is performed, for example by neutralization as described above before it is forwarded to further treatment via the pump 53, and duct 54, for example for waste water treatment.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of conditioning condensate generated in a compression section of a gas purification unit, said method comprising:
   a) compressing carbon dioxide rich flue gas from a gas cooling, condensing and/or cleaning device;
   b) cooling of the gas below the water dew point;
   c) recirculating the condensate formed during the cooling in b) comprising carbon dioxide to the inlet of a lower end of the gas cooling, condensing and/or cleaning device;
   d) introducing the condensate of step c) to the gas cooling, condensing and/or cleaning device; and
   e) degassing of the condensate whereby the carbon dioxide rich vapor is released into the vapor phase in the lower end of the gas cooling, condensing and/or cleaning device.

2. The method of claim 1, wherein the gas purification unit comprises a post combustion CO2 capture purification unit.

3. The method of claim 2, wherein the post combustion $CO_2$ capture purification unit is an amine based absorption process.

4. The method of claim 2, wherein the post combustion $CO_2$ capture purification unit is performed in a chilled ammonia system.

5. The method of claim 1 wherein step d) comprises
   d) introducing the condensate of step c) into a separate compartment arranged within the gas cooling, condensing and/or cleaning device, for vapor disengagement/release and optional conditioning of the condensate.

6. The method of claim 1 comprising wherein step d) comprises
   d) introducing the condensate of step c) into the lower part of the gas cooling, condensing and/or cleaning device.

7. The method of claim 1 wherein
   c) recirculating the condensate of step b) into a vessel for releasing the carbon dioxide rich vapor and conditioning the condensate;
   d) forwarding the carbon dioxide rich vapor to the flue gas condenser.

8. A system for conditioning condensate generated in a compression section of a gas purification unit, the system comprising:
   a flue gas condenser
      being operative for receiving at least a portion of partly cleaned carbon dioxide rich flue gas;
      being operative for removing at least a portion of the water content of the partly cleaned carbon dioxide rich flue gas to condense water therefrom;
   means for compressing the carbon dioxide rich flue gas;
   means for condensing water vapor from the carbon dioxide rich flue gas; and
   means for releasing parts of the carbon dioxide included in the water and returning it back to the flue gas.

9. The system of claim 8, wherein the gas purification unit comprises a post combustion CO2 capture purification.

10. The system of claim 9, wherein the gas purification unit comprises an amine based absorption process.

11. The system of claim 10, wherein the post combustion $CO_2$ capture purification is performed in a chilled ammonia system.

12. The system of claim 8, further comprising:
   means for introducing the water comprising the carbon dioxide rich vapor phase is introduced into a separate compartment of the bottom of the flue gas condenser; and
   means for conditioning the remaining degassed condensate.

13. The system of claim 8, wherein the water comprising the carbon dioxide rich vapor phase is introduced into the bottom level of the flue gas condenser.

14. The of claim 8, further comprising:
   means for forwarding the water comprising the carbon dioxide rich vapor phase to a vessel for separation of water and carbon dioxide rich vapor phase;
   means for conditioning the remaining degassed condensate; and
   means for introducing the released carbon dioxide into the flue gas condenser.

* * * * *